(12) United States Patent
Nobile (10) Patent No.: US 12,325,487 B2
(45) Date of Patent: Jun. 10, 2025

(54) AUTOMATIC PEDAL FOR CYCLE

(71) Applicant: PÉDALISSIME 2020, Fréjus (FR)

(72) Inventor: Pascal Nobile, Laffrey (FR)

(73) Assignee: PÉDALISSIME 2020, Frejus (FR)

( * ) Notice: Subject to any disclaimer, the term of this patent is extended or adjusted under 35 U.S.C. 154(b) by 0 days.

(21) Appl. No.: 18/276,294

(22) PCT Filed: Feb. 8, 2022

(86) PCT No.: PCT/EP2022/052934
§ 371 (c)(1),
(2) Date: Aug. 8, 2023

(87) PCT Pub. No.: WO2022/171587
PCT Pub. Date: Aug. 18, 2022

(65) Prior Publication Data
US 2024/0109620 A1 Apr. 4, 2024

(30) Foreign Application Priority Data
Feb. 10, 2021 (FR) ....................... 2101288

(51) Int. Cl.
*B62M 3/08* (2006.01)
*A43B 5/14* (2006.01)

(52) U.S. Cl.
CPC ............... *B62M 3/086* (2013.01); *A43B 5/14* (2013.01)

(58) Field of Classification Search
CPC ........ B62M 3/086; B62M 3/083; B62M 3/08; A43B 5/14
See application file for complete search history.

(56) References Cited

U.S. PATENT DOCUMENTS

| | | | | |
|---|---|---|---|---|
| 1,070,971 A | * | 8/1913 | Lowd | B62M 3/08 74/594.4 |
| 2,568,443 A | * | 9/1951 | Gerner | B62M 3/08 74/563 |
| 4,488,453 A | | 12/1984 | Drugeon et al. | |
| 4,686,867 A | | 8/1987 | Bernard et al. | |

(Continued)

FOREIGN PATENT DOCUMENTS

| | | |
|---|---|---|
| CN | 208021662 U | 10/2018 |
| DE | 299 01 785 U1 | 6/2000 |

(Continued)

OTHER PUBLICATIONS

Apr. 28, 2022 International Search Report issued in International Patent Application No. PCT/EP2022/052934.

*Primary Examiner* — Thomas C Diaz
(74) *Attorney, Agent, or Firm* — Oliff PLC (57) ABSTRACT

An automatic pedal for a cycle includes a rotation shaft designed to be fixed to a cycle. The rotation shaft extends in a longitudinal direction. A body is mounted rotating around the rotation shaft. The body defines a cavity to receive the rotation shaft. At least first and second primary connectors are designed to collaborate with at least two secondary connectors of a sole of a cycling shoe to fix the cycling shoe on the body. The rotation shaft has an annular groove. The body has an opening arranged to open out facing the annular groove. A rod is inserted in the opening and in the annular groove to limit the translational movement of the body with respect to the translation shaft in the longitudinal direction.

11 Claims, 3 Drawing Sheets

(56) References Cited

U.S. PATENT DOCUMENTS

| | | | | |
|---|---|---|---|---|
| 4,893,420 | A | * | 1/1990 | Bezin ................ A43B 5/14 |
| | | | | 36/131 |
| 5,377,561 | A | * | 1/1995 | Danieli ............. A43B 5/14 |
| | | | | 36/131 |
| 5,787,764 | A | | 8/1998 | Peyre |
| 6,405,614 | B1 | | 6/2002 | Beyl |
| 7,743,682 | B2 | | 6/2010 | Couturet et al. |
| 10,464,631 | B2 | * | 11/2019 | Winefordner ........ B62M 3/086 |
| 2008/0163721 | A1 | | 7/2008 | Stevovich |
| 2015/0189943 | A1 | * | 7/2015 | Fournier ............ A43B 7/1405 |
| | | | | 36/103 |
| 2015/0298762 | A1 | * | 10/2015 | Lin ................ B62M 3/08 |
| | | | | 74/594.4 |

FOREIGN PATENT DOCUMENTS

| | | |
|---|---|---|
| EP | 0 058 438 A2 | 8/1982 |
| EP | 0 146 454 A2 | 6/1985 |
| EP | 0 174 259 A1 | 3/1986 |
| EP | 0 360 245 A2 | 3/1990 |
| EP | 0 408 208 A1 | 1/1991 |
| EP | 0 531 873 A1 | 3/1993 |
| EP | 1 780 113 A1 | 5/2007 |
| FR | 2 768 391 A1 | 3/1999 |
| WO | 88/06315 A1 | 8/1988 |
| WO | 2011/010757 A1 | 1/2011 |

\* cited by examiner

AUTOMATIC PEDAL FOR CYCLE

BACKGROUND OF THE INVENTION

The invention relates to an automatic pedal for a cycle and to an assembly formed by an automatic pedal and a shoe.

PRIOR ART

A large number of configurations of automatic pedals for bicycles are known. The automatic pedals all have a body mounted rotating around a rotation shaft. The rotation shaft is mounted on the cycle and provides the mechanical connection between the body and the cycle. When the cyclist presses down on the pedal, he applies a force on the body that makes the pedal move with respect to the cycle and makes the body rotate with respect to the rotation shaft.

The automatic pedal generally has two primary connectors that are designed to collaborate with two secondary connectors of a cycling shoe. It is known to use two rotatable-mounted primary connectors or a single rotatable-mounted connector as illustrated in the document U.S. Pat. No. 5,787,764, in the document EP1780113 or in the document FR2768391. The two primary connectors move apart to let the secondary connectors pass before moving back together to fix the shoe on the pedal. The shoe is equipped with an adapter that fixes on the shoe and that has the two secondary connectors. The sole of the shoe is separated from the body of the pedal by the adapter. In an alternative embodiment, the front connector of the pedal is mounted fixedly on the body.

Different types of adapters exist that make the connection with different types of pedals. All the adapters are not compatible with all the pedal configurations.

In conventional manner, the automatic pedal has a rotation shaft that passes right through the body. One end of the rotation shaft is fixed to the cycle by means of a threaded area. The other end of the rotation shaft is provided with a blocker that is generally a nut to prevent the body and the rotation shaft from coming detached from one another.

An automatic pedal is known from the document EP0058438 having a rotation shaft passing through a body so that the body rotates around the rotation shaft. The body has a front connector and two rear connectors that enable a shoe to be fixed onto the upper surface of the body. The body is connected to the shaft by means of a rotary plate that enables the body to be rotated perpendicularly to the longitudinal axis of the rotation shaft so as to ensure that the body and shoe detach from one another. This configuration is not compact.

An automatic pedal is known from the document EP 0146454 or from the document EP 0360245 with a fixed front connector and a rotatable-mounted rear connector. This configuration can be improved as regards its efficiency of transmission of power between the foot and the axis of rotation of the pedal.

The document EP 0174259 discloses a pedal-shoe assembly with a pedal having a cage mounted rotating around a rotation shaft. The sole defines a cavity receiving the cage. The cage defines a hole that opens only onto an open lateral end for insertion and extraction of the rotation shaft. The hole has a cross-section that is identical to the cross-section of the rotation shaft. This configuration is not practical for performing quick and efficient attachment or detachment between the sole and the pedal. The cage has a pin movable in translation that inserts in a circular groove to block translation between the shaft and the cage. The cage is fixed to the sole by four attachments.

The document DE29901785 discloses a sole with a groove. The groove receives a rotation shaft provided with a circular groove. The sole is provided with a pin that is designed to be inserted in the circular groove to prevent translation of the rotation shaft in the groove along the longitudinal axis of the rotation shaft.

The document CN208021662 discloses a pedal that is fixed to a rotation shaft by means of a rotary ring. The rotary ring secures the pedal with the rest of the pedal assembly in removable manner. The pedal has a rod that extends in the continuation of the rotation shaft. The rod has a slot that collaborates with a blocker to secure the body of the pedal fixedly with respect to the rod. The body of the pedal rotates around the axis of rotation by means of the rotating ring.

The document US2008/0163721 discloses a pedal with a rotation shaft that has a groove passing round the shaft. The shape of the groove imposes a translational movement of the body of the pedal with respect to the shaft as the body performs its rotation around the shaft.

The document WO2010/010757 discloses a pedal the body of which is mounted rotating around a rotation shaft. The body is secured to the rotation shaft by means of a nut that blocks the body against the shaft. The outer end of the shaft is threaded to collaborate with the nut. An elastically deformable washer is inserted in a circular groove of the shaft and in a through hole of the body of the pedal to limit the stress on the nut.

OBJECT OF THE INVENTION

One object of the invention consists in providing an automatic pedal for a cycle that procures an improved efficiency in comparison with pedals of the prior art.

According to one feature of the invention, an automatic pedal for a cycle is proposed comprising:
- a rotation shaft designed to be fixed to a cycle, the rotation shaft extending in a longitudinal direction,
- a body mounted rotating around the rotation shaft, the body defining a cavity designed to receive the rotation shaft,
- at least first and second primary connectors designed to collaborate with at least first and second secondary connectors of a sole of a cycling shoe to fix the cycling shoe on the body.

The automatic pedal is remarkable in that the rotation shaft has an annular groove, in that the body has an opening arranged to open out facing the annular groove and in that a rod is inserted in the opening and in the annular groove to limit the translational movement of the body with respect to the rotation shaft in the longitudinal direction.

In advantageous manner, the annular groove is arranged in the terminal quarter in the longitudinal direction and opposite the end designed to be fixed on the cycle.

In a particular configuration, the cavity designed to receive the rotation shaft is a blind cavity.

Preferentially, the rod is provided with a smooth area arranged pressing on the annular groove.

According to one embodiment, the second primary connector is mounted movable in translation. More preferentially, the second primary connector is mounted movable in a direction perpendicular to the longitudinal direction.

According to another embodiment, the second primary connector is associated with a spring arranged to move the second primary connector towards the first primary connector in the absence of any external force.

It is advantageous to provide for the second primary connector and the spring to be formed by a part a first end of which forms the second primary connector and the second end of which forms the spring.

In preferential manner, the first primary connector is mounted fixedly on the body. Advantageously, the first primary connector is formed by an area salient from the body.

In a particular embodiment, the body has a curved upper surface to reproduce the curvature of a foot between the toes and the arch of the foot, between the first primary connector and the second primary connector.

It is a further object of the invention to provide an assembly formed by an automatic pedal for a cycle and a cycling shoe that is more efficient than the assemblies of the prior art.

This result tends to be achieved by means of an assembly that comprises an automatic pedal for a cycle according to any one of the foregoing configurations and a cycling shoe. The shoe is pressing directly on the body perpendicularly to the longitudinal direction of the rotation shaft and pressing on the rotation shaft by means of the body perpendicularly to the longitudinal direction of the rotation shaft.

Preferentially, a sole of the shoe is in direct contact with the body in continuous manner between the first primary connector arranged at the front of the body and the area of the body located perpendicularly to the longitudinal direction XX of the rotation shaft.

In a particular embodiment, the shoe has a sole that defines a front hollow designed to be located under the toes of a foot and a rear hollow designed to be arranged under the arch of the foot.

In advantageous manner, the front hollow forms a first bump on the surface of the top of the sole and the rear hollow forms a second bump on the surface of the top of the sole.

In an advantageous configuration, the depth of the front hollow is greater than the thickness of the sole around the front hollow and the depth of the rear hollow is greater than the thickness of the sole around the rear hollow.

It is also advantageous to provide for the shoe to have a sole that defines a central extra thickness designed to be facing a heel of a foot and extending in the longitudinal direction of the sole to increase the rigidity of a heel of the sole.

Advantageously, the shoe has a metatarsal area provided with studs, the studs being mounted salient from the bottom surface of the sole, and the first and second secondary connectors are mounted flush with the bottom surface of the sole.

In preferential manner, the studs are arranged only around the body of the automatic pedal when the shoe is fixed to the automatic pedal.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

In order to improve the efficiency of transmission of power between the cyclist's foot and the crankset, it is advantageous to modify the configuration of an automatic pedal 1 for a cycle. It is in particular advantageous to modify the configuration of the automatic pedal 1 to reduce the distance between the bottom surface of the foot and the axis of rotation of the automatic pedal 1 as far as possible so as to enhance the efficiency of power transmission from the foot to the cycle.

The automatic pedal 1 for a cycle comprises a rotation shaft 2 designed to be fixed to a cycle. The rotation shaft 2 extends in a longitudinal direction XX. The automatic pedal 1 comprises a body 3 mounted rotating around the rotation shaft 2. The body 3 defines a cavity designed to receive the rotation shaft 2.

The automatic pedal 1 comprises at least a first primary connector 4a and a second primary connector 4b designed to collaborate with at least a first secondary connector 5a and a second secondary connector 5b of a sole 6 of a cycling shoe to fix the cycling shoe on the body 3. The first primary connector 4a is a front connector whereas the second primary connector 4b is a rear connector. The axis that connects front primary connector 4a and rear primary connector 4b is preferentially perpendicular to longitudinal axis XX of the rotation shaft 2.

To improve the efficiency, it is advantageous for the rotation shaft 2 to have an annular groove 7. The annular groove 7 passes right round the rotation shaft 2 around the axis of rotation. In preferential manner, the annular groove 7 has a cross-section of semi-circular shape. The rotation shaft 2 is preferentially made from metal, preferably from a metal alloy, for example from steel, aluminium alloy or titanium alloy.

The body 3 defines an opening arranged to open out facing the annular groove 7. There is also a rod 8 that inserts in the opening and in the annular groove 7 to limit the translational movement of the body 3 with respect to the rotation shaft 2 in longitudinal direction XX. The rotation shaft 2 is fitted in the cavity of the body 3 until the annular groove 7 is facing the opening. The rod 8 is inserted in the opening of the body 3 and in the annular groove 7 thereby enabling the body 3 to rotate around the rotation shaft 2 while preventing translation in longitudinal direction XX.

The rotation shaft 2 is designed to be fixed to the cycle, for example in conventional manner and preferentially by screw-fastening. The rotation shaft 2 is provided at a first end, called inner end, with a fastening means 2a configured to secure the rotation shaft 2 with the cycle, for example a thread.

The power applied by the cyclist on the body 3 of the pedal 1 is transmitted to the rotation shaft 2 and to the crankset. Installation of the rotation shaft 2 inside the body 3 with fixing of the rotation shaft 2 by means of a rod 8 allowing rotation while preventing detachment enables a more compact pedal to be provided. The gain in compactness enables the top of the body 3 and the axis of rotation to be moved closer to one another thereby improving the efficiency of power transmission. The body 3 has a central area 3a, called metatarsal area, designed to be facing the metatarsal area of the foot perpendicularly to longitudinal axis XX when pedalling.

In preferential manner, the upper surface of the body 3 is flat or curved between the first primary connector 4a and the second primary connector 4b. The curved shape can be obtained with an upper surface having a constant curvature or with areas having different curvatures with multiple flat segments.

Preferentially, the curvature of the upper surface of the body 3 reproduces the curvature of the bottom surface of sole 6 of the shoe so as to have as large a contact surface as possible between the pedal and the sole. Preferentially, the curvature of the upper surface of the body 3 reproduces the curvature of the front of the cyclist's foot. By curving the upper surface of the body 3 in the same way as the bottom surface of the shoe and as the foot, the necessity of installing an interface adapter plate between the upper surface of the body 3 and the bottom surface of the shoe is circumvented. In the prior art configurations with a rigid sole, the sole is curved to enable the foot to have a natural rolling movement when walking. However, the bodies have a flat upper surface which imposes installation of an adapter plate. By eliminating the adapter plate, it is possible to move the bottom surface of the foot and the axis of rotation closer to one another thereby improving the efficiency. The curvature of the upper surface of the body 3 is a slight curvature that corresponds substantially to the curvature of the foot between its front part and its arch so that the metatarsal area of the sole is the area that presses on the rotation shaft 2 pressing directly on the body for a better power transfer.

In an advantageous embodiment, the rotation shaft 2 is located under the metatarsal area of the foot so that the pressing effect caused by the foot is more efficient.

Advantageously, the first primary connector 4a is mounted fixed on the body 3. The first primary connector 4a is designed to collaborate with the first secondary connector 5a of sole 6 that is located at the front.

It is particularly advantageous for the first primary connector 4a and the second primary connector 4b to be mounted salient from the upper surface of the body 3. It is also particularly advantageous for the distance that separates the first primary connector 4a and the second primary connector 4b, in a second direction YY perpendicular to longitudinal direction XX of the rotation shaft 2, to correspond to the distance between the cyclist's toes and the arch of his foot. It is advantageous for rear primary connector 4b to be mounted movable with respect to front primary connector 4a to adjust the distance separating the two primary connectors 4a/4b and thus fix the shoe on the automatic pedal 1.

In order to increase the efficiency of power transmission between the foot and the rotation shaft 2, it is advantageous to have a rigid pedal body 3. It is advantageous to have a body 3 of pedal 1 that extends from the arch of the foot to the base of the toes.

To perform securing of the body 3 on the rotation shaft 2, one or more annular grooves 7 can be formed on the rotation shaft 2. One or more rods 8 are mounted on the body 3 thereby preventing translation of the body 3 with respect to the rotation shaft 2 in longitudinal direction XX of the rotation shaft 2. To prevent translational movement of the body 3 with respect to the rotation shaft 2, the position of the annular groove 7 along the rotation shaft 2 is of little importance.

In order to bring the axis of rotation and the bottom surface of the foot as close as possible to one another, it is preferable to have a rotation shaft 2 that is as thin as possible while providing a good mechanical resistance. It is therefore advantageous to limit the number of annular grooves 7 to ensure a great rigidity of the rotation shaft 2. A single annular groove 7 is preferable. It is also advantageous to reduce the depth of the annular groove 7 so as not to weaken the rotation shaft 2 too much. The annular groove 7 results in thinning of the rotation shaft 2.

In advantageous manner, the annular groove 7 is located in the terminal quarter in longitudinal direction XX and opposite the first end designed to be fixed on the cycle.

It is particularly advantageous to place the annular groove 7 in the end area of the rotation shaft 2 in opposite manner to the first end that performs fixing between the rotation shaft 2 and the cycle. The farther the annular groove 7 is located from the fixing area with the cycle, the lower the forces applied by the cyclist on the pedal and therefore on the rotation shaft 2. The annular groove 7 is located as close as possible to the outer end of the rotation shaft 2 as the stresses when pedalling are lower in this area.

It is therefore more advantageous to have an annular groove 7 situated at the outer end of the rotation shaft 2 as this makes it possible to have a thinner rotation shaft 2 while at the same time resisting the pedalling forces.

A sealing part, for example an O-ring, is arranged between the rotation shaft and the cavity that receives the rotation shaft 2. The sealing part is arranged to prevent dust or moisture from penetrating into the cavity that receives the rotation shaft.

Figure 3:
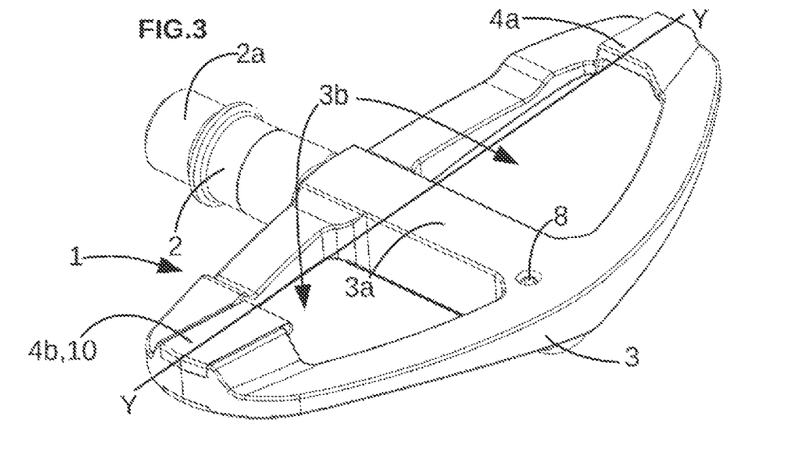
FIG. 3 schematically illustrates an automatic pedal for a cycle.
Figures 5, 6:
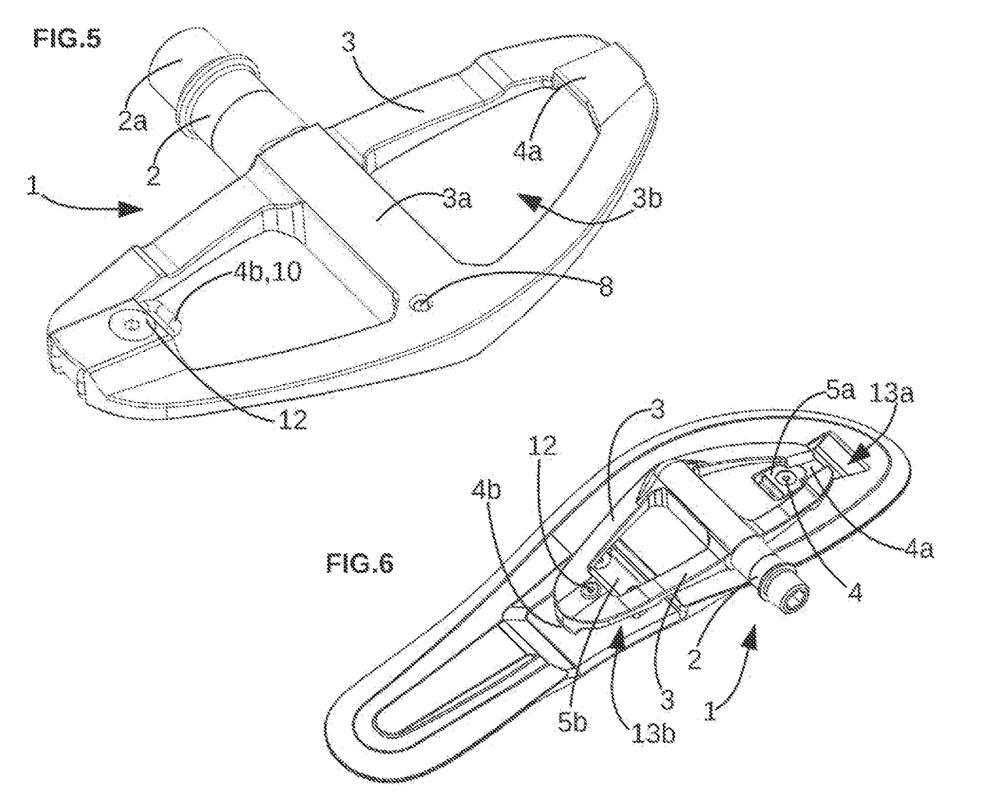
FIG. 5 schematically illustrates a top view of the automatic pedal illustrated in FIG. 4.
FIG. 6 schematically illustrates a bottom view of a pedal fixed to a sole of a shoe.
Figure 10:
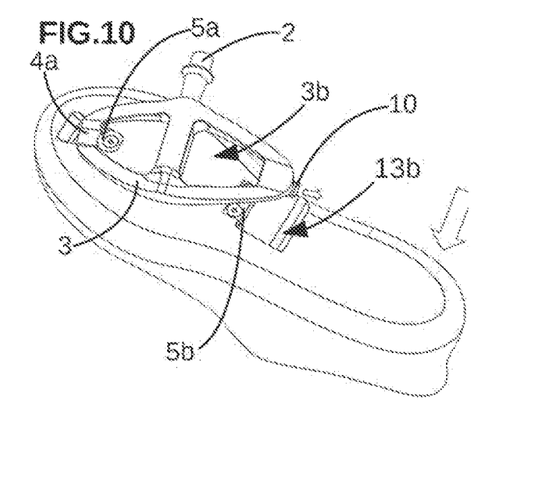
FIG. 10 schematically illustrates a detachment operation of the shoe from the automatic pedal.
Figure 11:
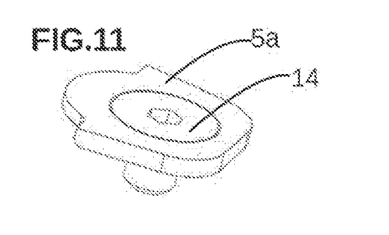
FIG. 11 schematically illustrates a front secondary connector designed to be fixed to a sole of a shoe.
Figure 12:
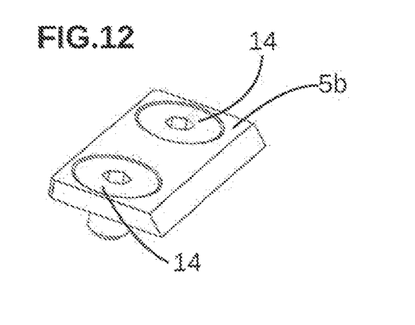
FIG. 12 schematically illustrates a rear secondary connector designed to be fixed to a sole of a shoe.

In a particular embodiment illustrated in FIGS. 3, 6 and 10, the cavity that receives the rotation shaft 2 is a blind cavity. In other words, the rotation shaft 2 does not pass right through the body 3. This avoids having to install a sealing part between the outer end of the rotation shaft 2 and the body 3 of the automatic pedal 1. The rotation shaft 2 exits from the body 3 only via a hole. This configuration is more compact, more tightly sealed and lighter as it reduces the number of parts. This avoids having a rotation shaft 2 that is longer and therefore heavier.

It is particularly advantageous for the rod 8 that performs fixing of the body 3 with the rotation shaft 2 to be provided with a smooth area arranged pressing on the annular groove 7. It is advantageous for the rod 8 to have a smooth area ensuring a strong contact between the rod 8 and the annular groove 7 so as to provide a strong fastening without penalising rotation. The contact area between the rod 8 and the rotation shaft 2 can be associated with a grease or an oil to facilitate sliding.

In advantageous manner, the hole of the body 3 designed to receive the rod 8 is a blind hole. It is preferable for the hole to have a tapping designed to collaborate with a thread of the rod 8. However, in an alternative embodiment, the hole can be pass-through and the rod 8 passes through the body 3 to press on the two opposite sides of the body 3. The rod 8 can be fixed to the body 3 via its two ends. In the illustrated embodiment, the hole receiving the rod 8 opens onto the upper surface of the body 3. The hole can open onto the bottom surface of the body. The hole can have any orientation so long as it allows the rod to be inserted in the annular groove.

In a preferential configuration, the second primary connector 4b forming the rear primary connector is mounted movable in translation. The use of a rear primary connector 4b mounted movable in translation makes it possible to have a more compact pedal in comparison with a first primary connector mounted movable in rotation. Advantageously, rear primary connector 4b is mounted movable in translation in direction YY or it has a component in direction YY. Advantageously, the second primary connector 4b is mounted movable in a direction perpendicular to longitudinal direction XX. The second primary connector 4b is mounted movable in translation in the longitudinal direction of the cyclist's foot.

In preferential manner, rear primary connector 4b mounted in translation is salient from the upper surface of the body 3 and translates in a plane that is offset from the upper surface of the body 3. The translation plane is raised with respect to the upper surface of the body 3 so that the point of contact between rear primary connector 4b and rear secondary connector 5b is above the upper surface of the body 3. The point of contact is located above the pedal, which is mechanically preferable. In preferential manner, rear primary connector 4b is the highest element of the rear part of the pedal, i.e. the part located at the rear of the pedal with respect to the axis of rotation.

It is then advantageous for the connector to be inserted in a depression of the sole 6 and not in a cavity of an adapter plate mounted salient from sole 6. The document EP 0531873 illustrates an automatic pedal wherein a front connector sinks into a cavity of an adapter plate and a rear connector is offset in translation to receive a rear connector of the shoe salient from the sole. The rear connector is located under the contact plane between the adapter plate and the body of the pedal which imposes a large increase of the distance between the cyclist's foot and the axis of rotation and therefore a loss of efficiency when pedalling. This also implies the use of an adapter plate and therefore a discomfort when walking with the shoe. A similar configuration is illustrated in the document WO 88/06315 or in the document EP 0408208.

Figure 4:
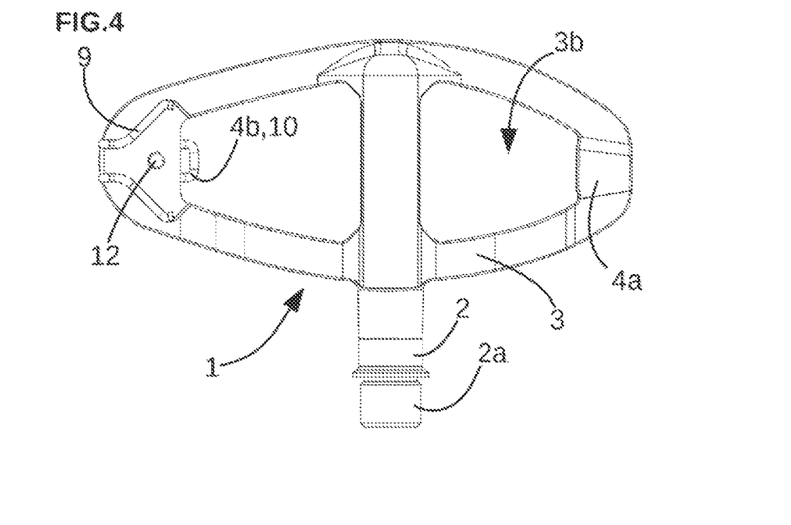
FIG. 4 schematically illustrates a bottom view of another embodiment of a rear primary connector of an automatic pedal for a cycle.

In advantageous manner, the second primary connector 4b is associated with a spring 9 arranged to move the second primary connector 4b with respect to the first primary connector 4a preferably towards the first primary connector 4a in the absence of any external force. The spring 9 can be formed by any suitable configuration. The spring 9 can be a spring working in compression or a spring working in elongation. In the embodiment illustrated in FIG. 1, the spring is a coil spring, but a torsion spring, a leaf spring or any other configuration of spring is possible. The spring can be formed by a part that deforms elastically in a cavity as illustrated in FIG. 4. Deformation of the spring 9 generates a force between a keeper of the primary connector and the secondary connector. In this particular embodiment, the spring 9 is monolithic with the second primary connector 4b.

In the embodiment of FIG. 4, the second primary connector 4b and the spring 9 are formed by the same part. A second end of the part deforms elastically to form the spring 9 when the first end of the part moves due to the second secondary connector 5b. Preferentially, the part is in the form of a wire.

In the embodiment of FIG. 3, rear primary connector 4b has a keeper 10 in the form of a plate mechanically and functionally associated with the spring 9. In the embodiment of FIG. 4, rear primary connector 4b has a keeper 10 in the form of a wire pin that is extended by the spring 9. It is possible to combine these two embodiments to have a keeper in the form of a wire pin mechanically and functionally associated with the spring 9 (embodiment not illustrated).

It is particularly advantageous to provide for the front primary connector 4a to be mounted fixed on the body 3. Front primary connector 4a enables the front part of the shoe to be fixed to the body 3 of the pedal 1. The rear primary connector 4b moves in translation to perform fixing of the shoe.

It is particularly advantageous for the body 3 and front primary connector 4a to be formed by one and the same part, i.e. from the same material and unremovable from one another. Such a configuration is illustrated in FIGS. 1, 3, 6, 9 and 10. In preferential manner, front primary connector 4a is engineered monolithic with the body 3, i.e. not removable. Front primary connector 4a is advantageously formed by a salient portion of the body 3.

The front primary connector 4a and the rear primary connector 4b are preferentially made from metal, for example a metal alloy. For example, the primary connectors 4a and 4b are made from steel, brass, or an aluminium alloy.

In the illustrated embodiments, engagement of the sole on the automatic pedal results in separation of the second primary connector 4b with respect to the first primary connector 4a. However, it is also possible to provide a configuration in which engagement results in a movement of front connector 4a and rear connector 4b towards one another. It is possible to orient the connector differently in the slide and to offset the position of the spring 9 or change the type of the spring 9. For example, a spring working in compression is replaced by a tension spring.

It is also advantageous for the automatic pedal 1 to be apertured on both sides of the rotation shaft 2 and between primary connectors 4a/4b to reduce the weight of the automatic pedal 1. In the illustrated embodiment, the body 3 defines two through holes 3b separated by the rotation shaft 2.

It is also advantageous for the body 3 to define the slide for a keeper 10 of rear primary connector 4b. The keeper 10 moves in translation in the slide. The body preferentially defines the housing for the spring 9.

To improve transmission of the pedalling force between the foot and the pedal, it is advantageous for upper surface of the body 3 to define, with the bottom surface of the sole 6, a continuous contact surface that extends from the metatarsal area of the pedal facing the rotation shaft up to front primary connector 4a. The continuous pressing contact limits deformation of the sole 6 in its front part. As an alternative or in combination, it is advantageous for the upper surface of the body 3 to define, with the bottom surface of the pedal, a continuous contact surface that extends from the metatarsal area of the pedal facing the rotation shaft up to rear primary connector 4b. The continuous pressing contact limits the deformation of the sole 6 in its rear part. It is particularly advantageous for the sole 6 of the shoe to be in direct contact with the body 3 in continuous manner between the first primary connector 4a located at the front of the body 3 and the area of the body 3 arranged perpendicularly to longitudinal direction XX of the rotation shaft 2.

To make walking easier and to reduce slipping, it is advantageous for the sole 6 to be provided with studs. However, in order not to penalise the pedalling efficiency, the studs do not come into contact with the upper surface of the body 3. It is advantageous for the studs to be situated on the circumference of the front part of pedal 1 outside the area delineated by the body. It is advantageous for the inner part of the body 3 of the pedal to be offset towards the rotation shaft 2 and/or thinned so as to allow a shoe to be used that is provided with studs on an inner portion of the sole. The studs are located around the body 3 on the inner and outer portions of the sole 6. The offset of the inner part of the body 3 enables the foot to be detached by rotation without being hampered by the studs.

The inner studs enter hole 3b or holes 3b of the pedal when the shoe is detached. Preferentially, the studs are arranged only around the body of the automatic pedal when the shoe is fixed to the automatic pedal 1. The central metatarsal area of the sole is devoid of studs so as not to move the foot away from the axis of rotation. The inner metatarsal area of the sole is devoid of studs so as not to hamper rotation of the foot. The outer metatarsal area of the sole can be provided with studs. It is also advantageous to fit studs in the rear area of the sole, for example facing the heel.

Figure 2:
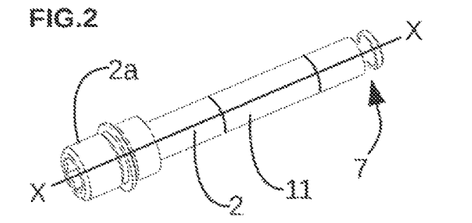
FIG. 2 schematically illustrates a rotation shaft.

To improve the rotation of the body 3 with respect to the rotation shaft 2, it is advantageous to install at least one bearing 11 between the rotation shaft 2 and the body 3 as illustrated in FIG. 2. When a bearing 11 is present, it is advantageous to place the annular groove 7 between the bearing 11 and the outer end of the rotation shaft 2. The bearing 11 can be a smooth bearing or a roller bearing.

The technical solution proposed is particularly advantageous as it comprises few parts and notably, in a particular case, a body 3 defining front primary connector 4 and the slide of rear connector 4b, a rotation shaft 2, at least one bearing 11, a rod 8, a keeper 10, a spring 9 and possibly securing means 12 for attaching the spring 9 to the body 3. It is then possible to form an economical, rigid and efficient automatic pedal.

Figure 1:
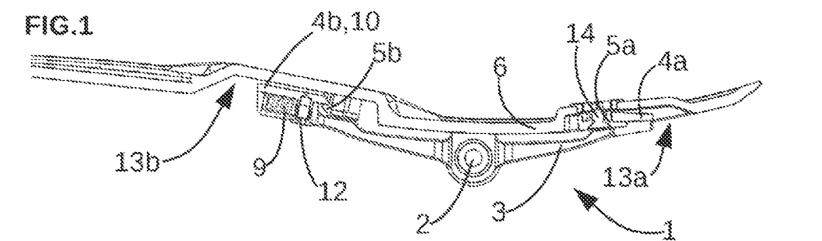
FIG. 1 schematically illustrates a side view of a sole fitted on a pedal body itself mounted rotating around a rotation shaft.

FIGS. 4 and 5 illustrate a particular embodiment of a rear primary connector 4b that also forms a spring 9. Rear primary connector 4b and the spring 9 are formed by the same part that is mounted on the body 3 and that is secured in position by means of a plate and securing means 12. Securing means 12 is preferentially in the form of a screw. The body 3 and the plate form a slide which imposes translation of rear primary connector 4b. By moving to the rear, rear primary connector 4b moves the clamps of the spring 9 which applies a force that biases rear primary connector 4b to its equilibrium position. FIG. 1 illustrates another configuration with a spring 9 housed in the body 3. The spring 9 applies a force that places rear primary connector 4b in its equilibrium position, for example pressing the latter against the body 3. In general manner, attaching the shoe loads the spring 9.

There is also an advantage to be found in using an assembly formed by an automatic pedal for a cycle 1 according to any one of the foregoing configurations and a cycling shoe devoid of an adapter plate.

In the absence of an adapter plate, the sole 6 of the shoe is pressing directly on the body 3 perpendicularly to longitudinal direction XX of the rotation shaft 2. The shoe is also pressing on the rotation shaft 2 by means of the body 3 perpendicularly to longitudinal direction XX of the rotation shaft 2. This configuration reduces the distance between the foot and the axis of rotation.

The configurations presented reduce the distance between the foot and the axis of rotation thereby improving the pedalling efficiency.

In advantageous manner, the sole 6 of the shoe is in direct contact with the body 3 in continuous manner between the first primary connector 4a located at the front of the body 3 and the area of the body 3 located perpendicularly to the longitudinal direction of the rotation shaft 2.

In advantageous manner, the sole 6 is monolithic and rigid. The sole 6 of a cycling shoe can be made from plastic or from composite material. What is meant by rigid is preferentially that the thickness of the sole 6 is less than 6 mm and that application of a force of 25N applied at 170 mm from the metatarsal area designed to be facing the rotation shaft 2 of the pedal results in a movement less than or equal to 10 mm, metatarsal area 9 being clamped. The force and movement are applied and measured at 170 mm in the direction of the heel so as to represent a pedalling force. The thinner the sole, the smaller the distance between the foot and the axis of rotation, which improves the efficiency. It is also advantageous to have a rigid sole so that the power supplied by the foot is better transmitted to the pedal.

The sole 6 is advantageously made from plastic material, preferentially in the form of a composite material. It is also possible to make sole from a composite material comprising carbon fibres and/or glass fibres. It is also possible to manufacture the sole 6 from a metal.

The sole 6 has a bottom surface (or under surface) designed to come into contact with the ground when the user walks. The bottom surface is curved in its front part between the arch of the foot and the front end of the foot so as to reproduce the curvature of the foot. To facilitate walking, it is particularly advantageous for the metatarsal area not to have an adapter plate so that the rolling movement of the foot is as natural as possible in spite of a rigid sole 6.

Monolithic the sole 6 defines a front hollow 13a designed to collaborate with front primary connector 4a. The front hollow 13a can have or is associated with front secondary connector 5a. Front secondary connector 5a is advantageously made from metal and more preferentially from metal alloy, for example from steel, brass or aluminium alloy. The sole 6 defines a rear hollow 13b designed to collaborate with rear primary connector 4b. Rear hollow 13 can have or is associated with a rear secondary connector 5b. Rear secondary connector 5b is advantageously made from metal and more preferentially from metal alloy, for example from steel, brass or aluminium alloy.

Front secondary connector 5a and rear secondary connector 5b are advantageously connectors mounted fixed on the sole 6. Front and rear secondary connectors 5a/5b are fixed on the bottom surface of the sole 6.

The front hollow 13a is situated between the front end of the sole 6 and metatarsal area 13c in contact with the automatic pedal. In preferential manner, the front hollow 13a is situated substantially in the middle of the width of the sole 6. Front secondary connector 5a is arranged in the front hollow 13a. Front secondary connector 5a is located between the curved plane of the bottom surface of the sole 6 and the top surface of the sole 6. In preferential manner, front secondary connector 5a is arranged flush with the bottom surface of the sole 6. When the bottom surface of the sole 6 has studs, front secondary connector 5a does not come into direct contact with the ground. Front secondary connector 5a does not form a localised area salient from the sole 6 which prevents the risk of the shoe sliding on the ground. The shoe has a metatarsal area 13c equipped with studs. The studs are mounted salient from the bottom surface of the sole 6 and first and second secondary connectors 5a, 5b are mounted flush with the bottom surface of the sole 6.

On its bottom surface, the monolithic sole 6 comprises a rear hollow 13b situated between the rear end of the sole 6 and metatarsal contact area 13c, preferably facing the arch of the foot. Preferably, the rear hollow 13b is positioned substantially in the middle of the length and the width of the sole 6. The rear hollow 13b opens onto at least one of the lateral sides of the sole 6. By opening onto a lateral side, it is possible to detach the shoe by rotation around the axis of rotation that passes through front connector 5a perpendicularly to the plane defined by the sole 6.

The front hollow 13a and the rear hollow 13b are dimensioned to respectively receive front primary connector 4a and rear primary connector 4b so that the contacts between the primary connectors and the secondary connectors are located in the depth of said front and rear hollows. Front and rear hollows 13a/13b form hollows that receive the front and rear areas salient from the upper surface of the body 3 of the pedal. This makes it possible to have a large pressing area between the sole 6 and pedal 1 in the metatarsal area that is facing the rotation shaft 2. The primary and secondary connectors insert in natural hollows of the foot which does not make the shoe uncomfortable. The front hollow 13a is designed to be located under the toes of the foot and the rear hollow 13b is designed to be located under the arch of the foot.

Rear secondary connector 5b is arranged in the rear hollow 13b and is situated between the curved plane of the bottom surface of the sole 6 and the upper surface. Rear secondary connector 5a is not salient from the bottom surface of the sole 6 to avoid forming a localised salient area that increases slipping and the risk of falling.

Preferentially, the front hollow 13a is situated in the area of the phalanges and hollow 13b is situated in the area of the arch of the foot. Front and rear hollows 13a/13b are dimensioned to respectively receive at least a part of front primary connector 4a and of rear primary connector 4b and to respectively receive front secondary connector 5a and rear secondary connector 5b so as to install the latter mainly or totally in the depth of said front and rear hollows 13a/13b. Front and rear secondary connectors 5a/5b are not salient from the monolithic sole 6, which means that the user is able to walk without the connectors hampering the rolling movement of the sole 6 on the ground.

By forming two shims integrated in the thickness of the sole 6 and not salient from the bottom surface of the sole 6, it is possible to form a shoe that procures a better pedalling efficiency. The sole 6 comprises the secondary connectors thereby avoiding having to fit an adapter plate.

Figure 7:
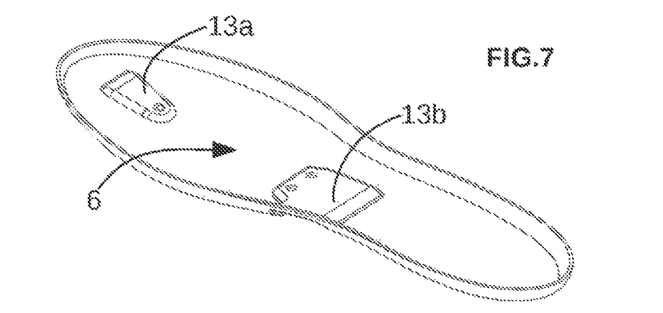
FIG. 7 schematically illustrates a top view of a sole that is particularly suitable for collaborating with a pedal according to the invention.
Figure 8:
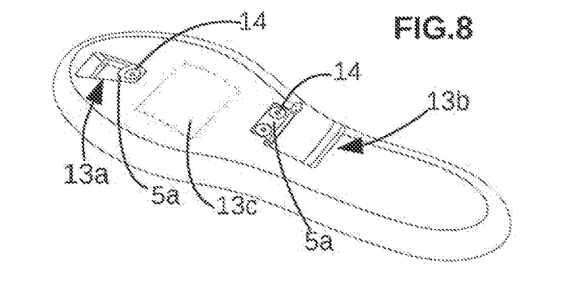
FIG. 8 schematically illustrates a bottom view of a sole that is particularly suitable for collaborating with a pedal according to the invention.
Figure 9:
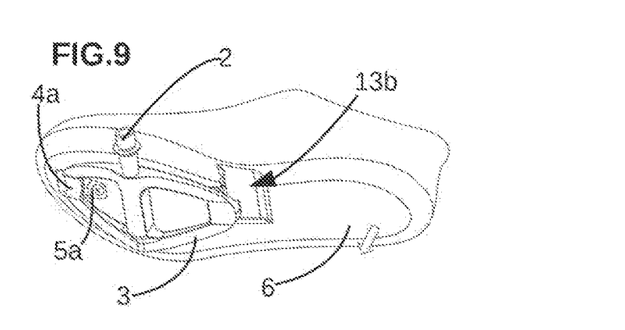
FIG. 9 schematically illustrates an attachment operation of the shoe on the automatic pedal.

As illustrated in FIGS. 7 and 8, metatarsal area 13c of the sole 6, situated between front and rear hollows 13a/13b, is designed to have a direct contact with the upper surface of the automatic pedal 1 in order to transmit the forces from the shoe directly to the automatic pedal 1. The direct contact area can be smooth.

It is advantageous to cover the contact area with a protective layer made from deformable material, for example a flexible material. The deformable material has a small thickness, for example less than 1 mm. When the user walks, it is common for grains of sand or little stones to stick underneath the shoe. The deformable material will degrade in contact with these grains or stones which will prevent damage to the bottom surface of the sole 6 and/or the upper surface of the body 3. It is also possible to cover the metatarsal area of the pedal with a protective layer. The protective layer is of small thickness. The small thickness of the protective layers does not impair the efficiency and does not modify the behaviour of the sole or of the pedal. The use of a protective layer is considered as a direct contact between the sole 6 and the body 3.

As illustrated in FIGS. 6, 8, 9, 10 and 11, in a particular embodiment, front secondary connector 5a is positioned in contact with a rear edge of the front hollow 13a. It is also advantageous for the front hollow 13a to open onto the front of the sole 6 for ease of fixing between front primary connector 4a and front secondary connector 5a. Rear secondary connector 5b can be positioned in contact with a front edge of the rear hollow 13b to enhance the strength.

The sole 6 can comprise adjustment means of front secondary connector 5a along the longitudinal axis of the sole 6 so as to move front secondary connector 5a towards the front tip of the sole 6 or towards the heel. The sole 6 can comprise adjustment means of rear secondary connector 5b along the longitudinal axis of the sole 6 so as to move rear secondary connector 5b towards the front tip of the sole 6 or towards the heel.

In advantageous manner, a front insert is mounted fixed on the sole 6. The front insert is preferably sunk in the sole 6. The front insert comprises adjustment means configured to adjust the position of front secondary connector 5a in the front hollow 13a. For example, the front insert has several tapped holes designed to receive a securing part 14 to fix front secondary connector 5a on the sole 6. In preferential manner, the insert is made from a different material than the material forming the sole 6. For example, the insert is made from metal.

In advantageous manner, a rear insert is mounted fixed on the sole 6. The rear insert is preferably sunk in the sole 6. The rear insert comprises adjustment means configured to adjust the position of rear secondary connector 5b in the rear hollow along the longitudinal axis of the sole 6, i.e. the axis connecting the toes with the heel. For example, the rear insert has several tapped holes designed to receive a securing part 14 to fix rear secondary connector 5b on the sole 6. For example, the insert is made from metal.

Advantageously, the securing parts 14 are the form of screws that are inserted in nuts formed by the inserts.

In preferential manner, the shoe has a sole 6 that defines a central extra thickness designed to be facing a heel of a foot and extending in the longitudinal direction of the sole 6 to enhance the rigidity of a heel of the sole 6. Such an embodiment is illustrated in FIG. 6.

According to the illustration of FIG. 10, in a detachment phase of the shoe from the pedalling position, the user performs a rotation action of the foot, the heel moving towards the outside of the bike. During this action, rear primary connector 4b moves in the rear hollow 13b. During this first phase, the sole 6 is still attached to the automatic pedal 1 and by continuing the rotation action of the foot, the sole 6 becomes detached when rear primary connector 4b escapes from rear shim. Front primary connector 4a detaches naturally from front shim when rear primary connector 4b detaches from rear secondary connector 5b.

As illustrated in FIGS. 1, 6, 7, 8, 9 and 10, it is particularly advantageous for the bottom surface of the sole 6 to be curved. What is meant by curved is that the bottom surface of the sole 6 rises up from the metatarsal area to the front tip of the sole 6 to follow the curvature of the foot and the curvature of the sole 6.

It is also preferable for the bottom surface of front secondary connector 5a to be flush with the bottom surface of the sole 6 or slightly depressed in the thickness of the sole 6. It is also advantageous for the bottom surface of rear secondary connector 5b to be mounted flush with the bottom surface of the sole 6 or for the bottom surface to be sunk into the sole 6. Secondary connectors 5a/5b are not mounted salient from the sole so as not to hamper walking as is the case in the configurations of the prior art.

It is preferable for front secondary connector 5a to be pressing on the lateral surfaces of the front hollow 13a, i.e. in the widthwise direction of the sole 6 without necessarily pressing on the bottom surface. This configuration is mechanically stronger than a shim mounted salient on the sole 6.

It is preferable for rear secondary connector 5b to be pressing on at least one lateral surface of the rear hollow 13b.

In the illustrated configuration, the front and rear secondary connectors take advantage of the lateral surfaces of the cavities to enhance the strength conferred by the sole 6 thereby providing a greater shear strength during the separation operations between the sole 6 and pedal 1.

When the thickness of the sole 6 is small, it is advantageous for the front hollow 13a and/or the rear hollow 13b to have a greater height or depth than the thickness of the sole 6. In this particular case, the bottom surface of the sole 6 in the front and/or rear hollow is located in a plane above the plane defined by the upper surface of the sole 6 around the associated protuberance. In other words, the metatarsal area presents a thickness between the upper surface and the bottom surface that is less than or equal to the depth of the rear hollow 13b. The protuberance enables the sole 6 to be strengthened. The front hollow 13a forms a front bump on the upper surface and the sole 6 and the rear hollow 13b forms a rear bump on the upper surface of the sole 6. The depth of the front hollow 13a is greater than the thickness of the sole 6 around the front hollow 13a and the depth of the rear hollow 13b is greater than the thickness of the sole 6 around the rear hollow 13b.

A part of the thickness of the protuberance can be compensated by the comfort layers that are arranged on the upper surface of the sole 6 to separate the foot and the sole 6.

As indicated in the foregoing, it is advantageous for the sole 6 to be monoblock i.e. formed by a single part. It is also advantageous for the sole 6 to only comprise the front cavity and rear cavity.

In one embodiment, the sole 6 is made completely from composite material, for example from carbon fibre. It is also possible to provide a moulded sole 6.

The invention claimed is:

1. An automatic pedal for a cycle comprising:
a rotation shaft designed to be fixed to a cycle, the rotation shaft extending in a longitudinal direction,
a body mounted rotating around the rotation shaft, the body defining a cavity designed to receive the rotation shaft and an upper face designed to be in direct contact with a lower face of a sole of a cycling shoe, and
at least a first primary connector and a second primary connector designed to collaborate with at least a first secondary connector and a second secondary connector of the sole of the cycling shoe to fix the cycling shoe on the body,
wherein the second primary connector is mounted movable in translation in a direction perpendicular to the longitudinal direction,
wherein the body has a curved upper surface to reproduce a curvature of a foot between toes and an arch of the foot between the first primary connector and the second primary connector, the curved upper surface being designed to be in direct contact with a lower face of the cycling shoe, and
wherein the first primary connector and the second primary connector are salient from the curved upper surface.

2. An automatic pedal for a cycle comprising:
a rotation shaft designed to be fixed to a cycle, the rotation shaft extending in a longitudinal direction,
a body mounted rotating around the rotation shaft, the body defining a cavity designed to receive the rotation shaft and an upper face designed to be in direct contact with a lower face of a sole of a cycling shoe, and
at least a first primary connector and a second primary connector designed to collaborate with at least a first secondary connector and a second secondary connector of the sole of the cycling shoe to fix the cycling shoe on the body,
wherein the second primary connector is mounted movable in translation in a direction perpendicular to the longitudinal direction,
wherein the second primary connector is associated with a spring arranged to move the second primary connector towards the first primary connector in the absence of external stress, and
wherein a wire is shaped to form the second primary connector and to form the spring, the wire extending continuously to form the spring and the second primary connector.

3. The automatic pedal according to claim 2, wherein the body defines a hole receiving the spring, the spring being in contact with a wall of the hole in the absence of external stress.

4. The automatic pedal according to claim 2, wherein the body has a curved upper surface to reproduce a curvature of a foot between toes and an arch of the foot between the first primary connector and the second primary connector.

5. An assembly formed by an automatic pedal for a cycle and a cycling shoe, wherein the automatic pedal comprises:
a rotation shaft designed to be fixed to a cycle, the rotation shaft extending in a longitudinal direction,
a body mounted rotating around the rotation shaft, the body defining a cavity designed to receive the rotation shaft and an upper face designed to be in direct contact with a lower face of a sole of a cycling shoe, and
at least a first primary connector and a second primary connector designed to collaborate with at least a first secondary connector and a second secondary connector of the sole of the cycling shoe to fix the cycling shoe on the body,
wherein the cycling shoe comprises a rigid sole, at least a first secondary connector and a second secondary connector fixed to the sole and collaborating with the first primary connector and the second primary connector of the cycling shoe to fix the cycling shoe on the body,
wherein a lower face of the cycling shoe is in direct contact with an upper face of the body between the first primary connector and the second primary connector,
wherein the cycling shoe presses directly on the body perpendicularly to the longitudinal direction of the rotation shaft and pressing on the rotation shaft by means of the body perpendicularly to the longitudinal direction of the rotation shaft, and wherein the cycling shoe has a sole that defines a front hollow designed to be located under the toes of a foot and a rear hollow designed to be arranged under the arch of the foot, the front hollow being a recess with respect to contact plane between the upper face of the body and the lower face of the cycling shoe.

6. The assembly according to claim 5, wherein a sole of the cycling shoe is in direct contact with the body in continuous manner between the first primary connector arranged at a front of the body and the area of the body located perpendicularly to the longitudinal direction of the rotation shaft.

7. The assembly according to claim 5, wherein the front hollow forms a first bump on a surface of a top of the sole and the rear hollow forms a second bump on the surface of the top of the sole.

8. The assembly according to claim 7, wherein a depth of the front hollow is greater than a thickness of the sole around the front hollow and a depth of the rear hollow is greater than a thickness of the sole around the rear hollow.

9. The assembly according to claim 5, wherein the cycling shoe has a sole that defines a central extra thickness designed to be facing a heel of a foot and extending in a longitudinal direction of the sole to increase a rigidity of a heel of the sole.

10. An assembly formed by the automatic pedal according to claim 1 and a cycling shoe,
wherein the cycling shoe comprises a rigid sole, at least a first secondary connector and a second secondary connector fixed to the sole and collaborating with the first primary connector and the second primary connector of the cycling shoe to fix the cycling shoe on the body,
wherein a lower face of the cycling shoe is in direct contact with an upper face of the body between the first primary connector and the second primary connector, and
wherein the cycling shoe presses directly on the body perpendicularly to the longitudinal direction of the rotation shaft and pressing on the rotation shaft by means of the body perpendicularly to the longitudinal direction of the rotation shaft.

11. An assembly formed by the automatic pedal according to claim 2 and a cycling shoe,
wherein the cycling shoe comprises a rigid sole, at least a first secondary connector and a second secondary connector fixed to the sole and collaborating with the first primary connector and the second primary connector of the cycling shoe to fix the cycling shoe on the body,
wherein a lower face of the cycling shoe is in direct contact with an upper face of the body between the first primary connector and the second primary connector, and
wherein the cycling shoe presses directly on the body perpendicularly to the longitudinal direction of the rotation shaft and pressing on the rotation shaft by means of the body perpendicularly to the longitudinal direction of the rotation shaft.

\* \* \* \* \*